United States Patent [19]
Hehl

[11] 3,728,060
[45] Apr. 17, 1973

[54] INJECTION MOLDING MACHINE

[76] Inventor: Karl Hehl, Siedlung 183, Lossburg, Wurttemberg, Germany

[22] Filed: Apr. 14, 1971

[21] Appl. No.: 133,828

[30] Foreign Application Priority Data

Apr. 24, 1970   Germany....................P 20 20 060.6

[52] U.S. Cl. ..................425/191, 425/247, 425/450
[51] Int. Cl. ......................................B28b 17/00
[58] Field of Search....................425/190, 191, 192, 425/247, 450

[56] References Cited

UNITED STATES PATENTS

| | | | |
|---|---|---|---|
| 2,896,257 | 7/1959 | Norman et al.....................425/190 X |
| 3,373,459 | 3/1968 | Hehl................................425/450 X |
| 3,014,243 | 12/1961 | Hehl....................................425/192 |
| 3,388,431 | 6/1968 | Aoki.................................425/190 X |
| 3,430,294 | 3/1969 | Gerwalt............................425/191 X |

*Primary Examiner*—H. A. Kilby, Jr.
*Attorney*—Spencer & Kaye

[57] ABSTRACT

An injection molding machine having connecting sleeves for the connection of the supporting straps of injection units which operate transverse to and into the separating groove of a casting mold of the molding machine has separate means for securing the supporting struts in their respective connecting sleeves. Each of these means has a threaded bore defined in an end of a strut, and a bore with a shoulder defined in the sleeve, with the shoulder arranged to abut the surface of the strut end. A bolt is in threaded engagement with the threaded bore and in coaxial relationship with the strut. An injection unit operating transversely to the separating groove has a base provided with bearing surfaces for sliding engagement with the top of the machine base.

10 Claims, 5 Drawing Figures

INVENTOR.
Karl Hehl
BY Spencer & Kaye
ATTORNEYS

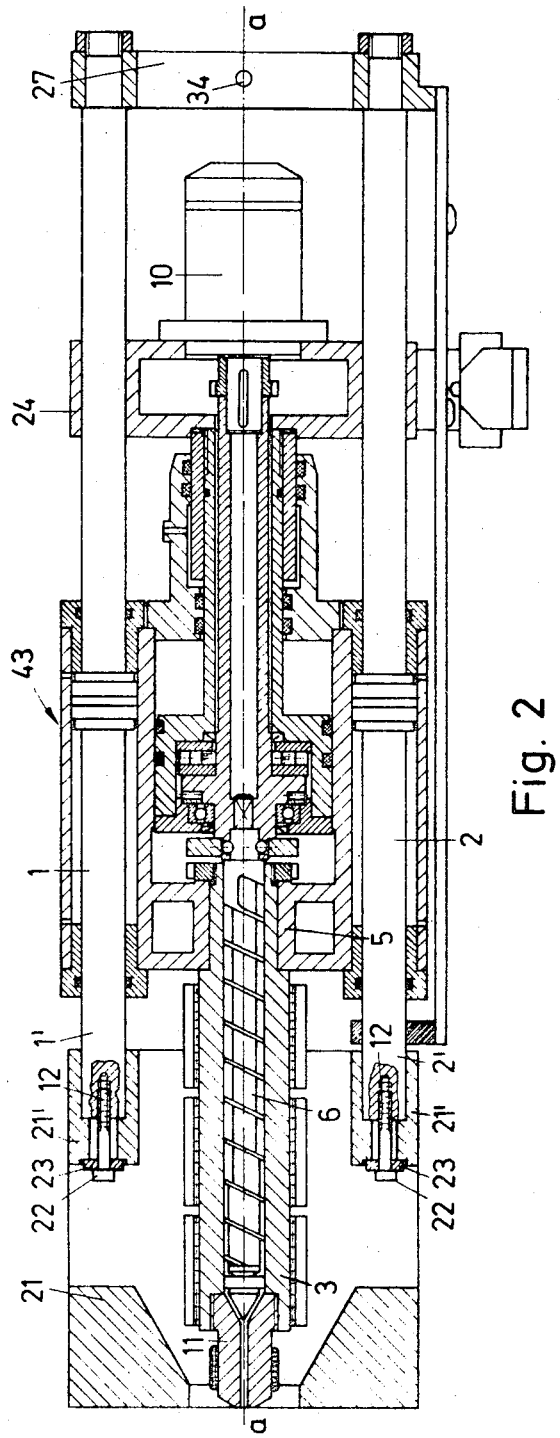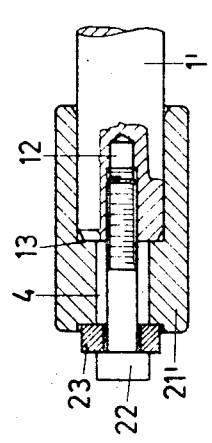

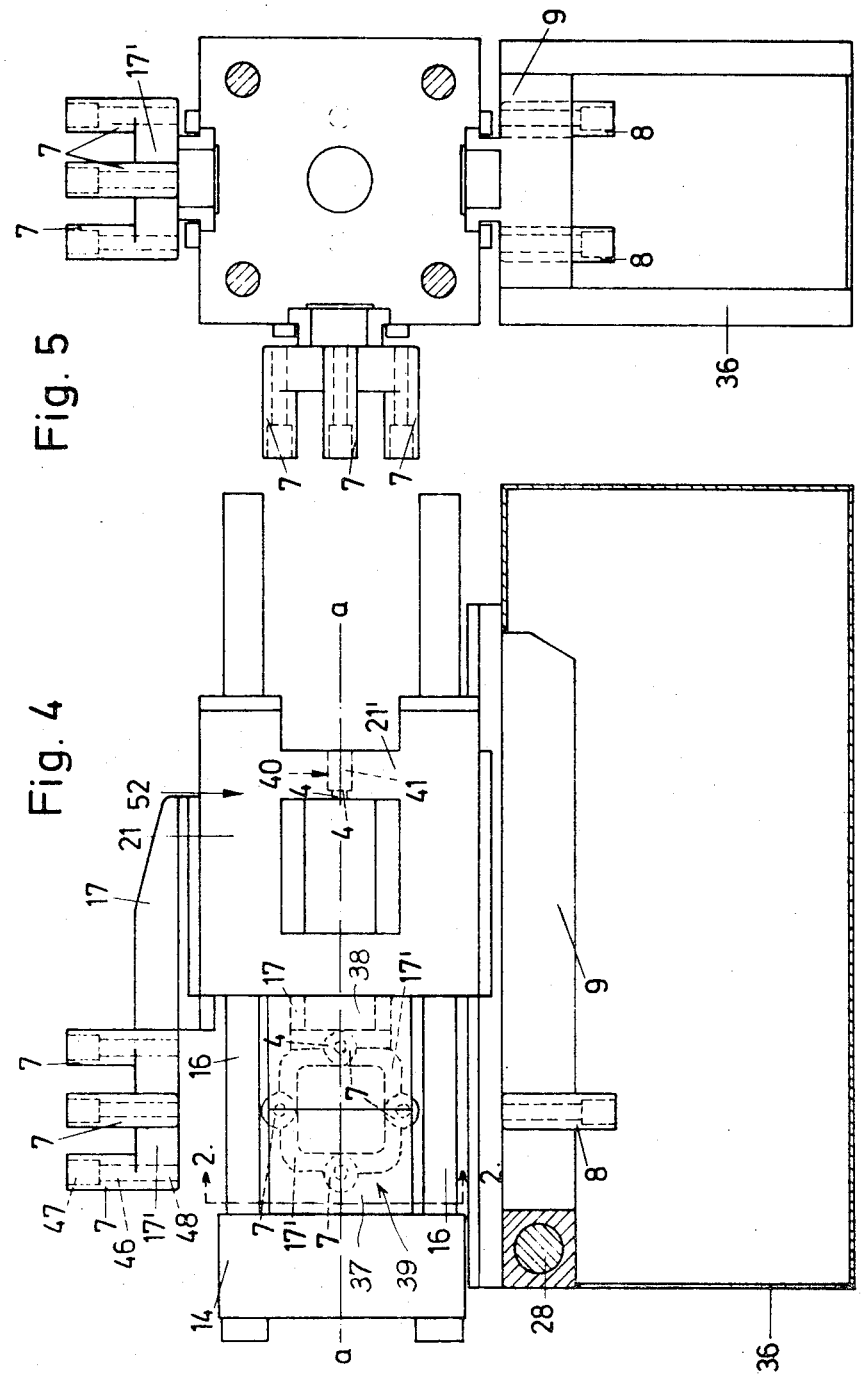

INJECTION MOLDING MACHINE

CROSS-REFERENCE TO RELATED APPLICATIONS

This application is related to the commonly owned application Ser. No. 133,829, filed Apr. 14, 1971, by Karl Hehl, and based on the German application No. P 20 19 875.8 filed Apr. 24, 1970.

BACKGROUND OF THE INVENTION

The present invention relates to an injection molding machine having connecting sleeves for the connection of the supporting struts of injection units which operate transverse and/or into the separating groove of a casting mold.

With known injection molding machines of the above-mentioned type, the struts are secured in the connecting sleeves by elements which pass through the jacket of the connecting sleeve at either a right or oblique angle to the insertion axis and engage into the insertion axis in a recess provided in the jacket of the struts. The securing elements, which extend laterally beyond the connecting sleeves, often prove to be a hindrance and cannot always be easily removed. This is particularly so when the connecting sleeves are molded, for example, to the fixed clamping plate of a clamping unit, or to a carriage which is axially displaceable on the fixed mold clamping plate and which is suited for the connection of an injection unit operating into the separating groove. In such cases, access to securing elements such as screw-threaded bolts is generally difficult, particularly for the attachment of tools. Similar difficulties also arise in connection with the connection of special units, such as core pullers, inserters and the like, which are supported by struts.

SUMMARY OF THE INVENTION

It is an object of the present invention to provide an injection molding machine of the above-mentioned type in which the above-mentioned problems are overcome.

This and other objects are accomplished according to the present invention by securing the ends of the supporting struts which are held by the connecting sleeves with bolts which are disposed in a coaxial relationship to these struts. Each bolt is in threaded engagement with an inner threading of a coaxial bore in the associated strut and abuts against a shoulder which limits its movement in a continuous and open bore defined in the connecting sleeve. Advisably, the connecting sleeves are provided with a bore section which opens at its rear side and which has a smaller inner diameter, the frontal sides of the supporting struts being supported by the annular shoulder formed at the transition point to the bore section having the smaller inner diameter.

Advantageously, the heads of the securing bolts are abutted against washers which rest against the shoulder of the connecting sleeve limiting the sleeve bore.

In a preferred embodiment of the present invention, an injection unit which operates transversely to the separating groove is provided with a sliding base whose sliding surface is disposed directly above the surface of the machine base.

The injection unit is provided with a device for moving it into or out of the connecting sleeves of the stationary clamping plate by means of at least one hand lever.

BRIEF DESCRIPTION OF THE DRAWINGS

FIG. 2 is a top plan, cross-sectional view of the injection unit according to FIG. 1 associated with a stationary clamping plate for a mold.

FIG. 3 is a cross-sectional view showing a detail of FIG. 2.

FIG. 4 is a side elevation view, partly in cross section, showing an injection molding machine including the stationary clamping plate of FIG. 2 and having a plurality of connecting sleeves for injection units operating transversely to and into the separating groove of the mold, the injection unit of FIG. 1 being removed to simplify the illustration.

FIG. 5 is a front elevational, partly cross-sectional view taken generally along line 2—2 of FIG. 4.

DESCRIPTION OF THE PREFERRED EMBODIMENTS

Figure 1:
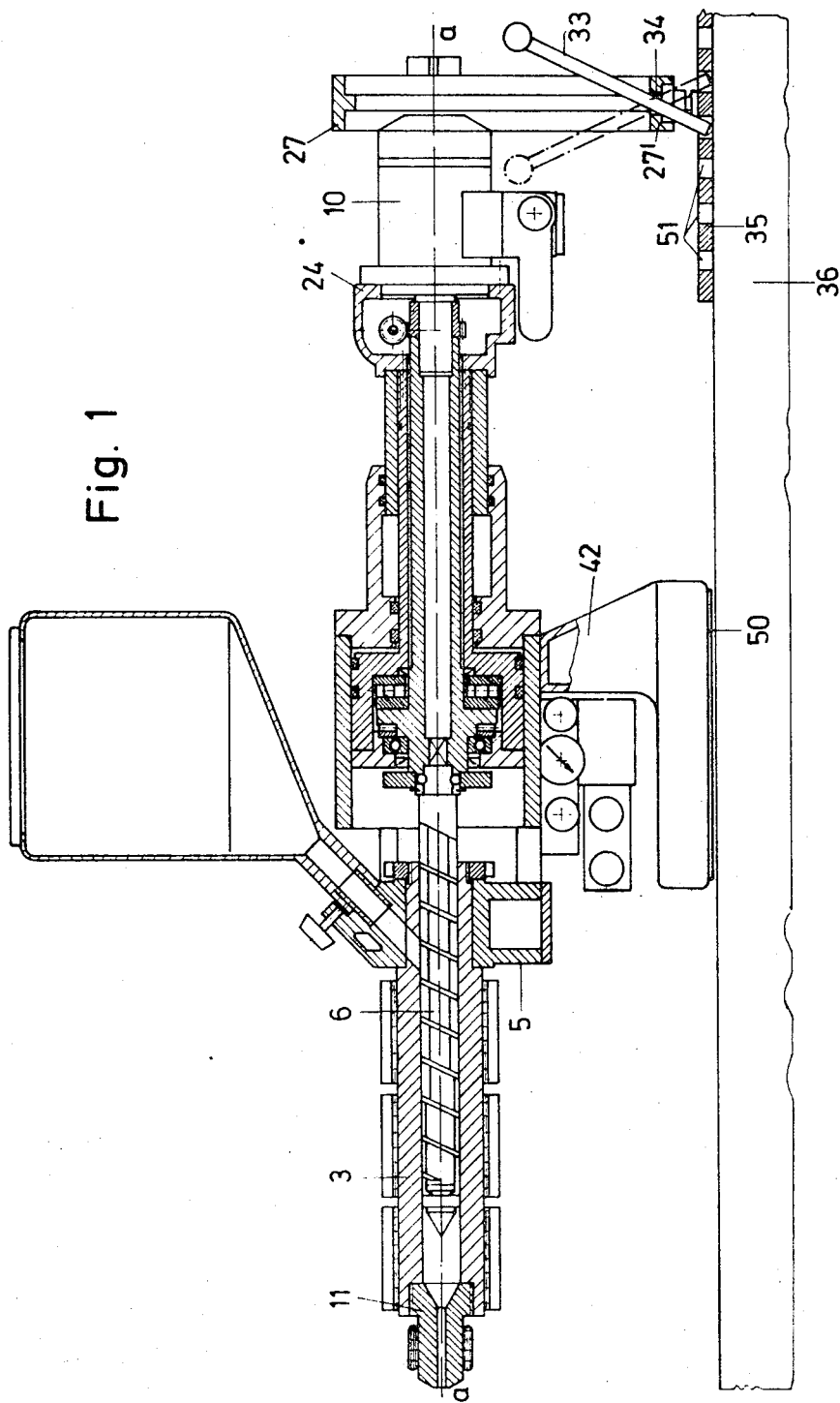
FIG. 1 is a side elevational, cross-sectional view of an injection unit for operation transversely to the separating groove of a mold, and provided with the device according to the present invention for moving the supporting struts into and out of the connecting sleeves of a stationary clamping plate.

As can be seen in FIG. 4, a pair of molded struts 9 is pivotally connected to a machine base 36 by means of turning pins 28. A clamping unit 52 is disposed to be axially slidable on struts 9. The stationary mold clamping plate 21 of the clamping unit 52 is provided with fluid, preferably hydraulic, pressure cylinders which are formed by bores defined in the mold carrier. The piston rods 16 of the pistons (not shown) of these hydraulic pressure cylinders support a movable mold carrier 14. The stationary mold clamping plate 21 is, thus, simultaneously a fluid drive means for clamping together fixed and movable mold parts 37 and 38, respectively, of mold 39. The above-mentioned pressure cylinders of the stationary mold clamping plate 21 are connected with portions forming connecting sleeves or portions 21' at their rearward ends. When injecting transversely to the separating groove along axis a—a, the axially extended mold clamping plate 21 is penetrated by an injection unit 43. The supporting struts 1,2 of unit 43 are inserted into the bores 40 defined in the connecting portions 21' of the mold carrier 10, as shown in FIGS. 2, 3 and 4. These bores 40 each have an input section 41 of a greater inner diameter for receiving the free strut ends 1', 2' (FIG. 2) of the injection unit and rear section 4 of smaller inner diameter which opens at the rear end of the portions 21'. The transition point between these bore sections forms an annular shoulder 13 arranged to abut the surface of the end of a strut 1,2. The supporting struts 1,2 of the injection unit 43 are each provided at their free ends with a concentric bore 12 having internal threading (FIGS. 2 and 3). A suitable, known clamping bolt 22 is in threaded engagement with each one of these internal threadings. This bolt 22 is coaxially placed into bore section 42, and its head 22' may be abutting against, for example, a washer 23 seated in a respective recess 44 defined in surface 45 of portion 21'.

The injection molding machine according to FIGS. 4 and 5 has a device for the rectangular connection of a known injection unit (not shown) for operating into the separating groove, or for the connection of a special unit, such as a core puller, an inserter, or the like. The device is provided with a carriage 17 which has connecting sleeves 7 for the struts of an injection unit. This carriage 17 can be selectively clamped in a guide defined in the axially extended stationary mold carrier 21, or displaced therein in a direction parallel to the opening direction of the clamping unit (axis a-a). A further slide guide to which a carriage 17 may be attached to form a slide bearing is defined on an adjacent side surface of the mold carrier 21, which preferably has a square cross section. A plurality — for example, four — connecting sleeves 7 are attached in a known manner, such as by molding, to a frame portion 17' of the carriage 17 (see FIG. 4).

Carriage 17 together with its frame portion 17' and its connecting sleeves 7 may be made of a single piece. The connecting sleeves 7 define continuous bores 46 which open at the rear of the carriage frame 17'. These bores 46 each have a section 47 of larger diameter at their free connecting end for the connecting sleeves which changes into a bore section 48 of smaller diameter, forming an annular shoulder 49 at the transition point.

Sleeve-type connecting elements 8 are fastened to the molded struts 9. These elements, or sleeves, 8 are formed to correspond to connecting sleeves 7 of the carriage 17. The supporting struts of all of the injection units and special units each have, in the manner of struts 1,2, a threaded coaxial bore at their free plug-in ends for holding a coaxial screw clamping bolt 22 which rests with its head against the rear of the carriage frame 17' or the connecting elements 8, as the case may be.

The injection unit 43 according to FIGS. 1 and 2 has supporting struts 1,2 held in connecting sleeves 21' of the stationary mold carrier 21 as set out above.

The injection cylinder 3 is held by a bridge 5 which is mounted on struts 1,2 for movement along axis a—a.

A suitable, known fluid motor 10 is provided as the rotational drive for a screw conveyor 6. Motor 10 is held by a supporting bridge 24 which is also axially displaceably mounted on struts 1, 2. A suitable, known injection cylinder 3 is provided with an open nozzle 11.

The injection unit 43 is provided with a sliding base 42. The slide surfaces of the base 42, which are formed by bearing elements 50 constructed of, for example, a suitable, known synthetic material, such as nylon, arranged directly above the top (in FIG. 2) planar, guide path free surface of machine base 36 when unit 43 is anchored in plate 21. There is also provided a frame 27 which connects together the rear ends of the struts 1,2 and is connected to struts 1,2, and which is a component of a device 27, 33, 35 for moving the injection unit out of the connecting portions 21' of the stationary mold clamping plate 21. This device has a perforated plate 35 which extends parallel to the injection axis a—a and is rigidly connected to machine base 36. The base leg 27' of the frame 27, which leg 27' extends perpendicularly to the perforated plate 35, is arranged with respect to plate 35 so that a hand lever 33 which passes through a hole 34 in the base leg 27' and whose free end 33' can be inserted selectively into one of holes 51 of the perforated plate 35 can serve to axially remove or insert the injection unit into or out of the bores 40 defined in connecting portions 21'.

It will be understood that the above description of the present invention is susceptible to various modifications, changes and adaptations, and the same are intended to be comprehended within the meaning and range of equivalents of the appended claims.

I claim:

1. In an injection molding machine for use with injection units each provided with supporting struts, the units operating transverse to a separating groove of a casting mold of the molding machine, the molding machine having a stationary mold clamping plate and connecting sleeves for connecting the supporting struts to the molding machine, the improvement comprising means for securing the supporting struts in their respective connecting sleeves, each means having a threaded bore defined in an end of a strut, a bore with a shoulder defined in the sleeve, with the shoulder arranged to abut the surface of the end, and a bolt in threaded engagement with said threaded bore and in coaxial relationship with the strut, each said sleeve bore being arranged for mounting the injection unit to operate transversely to the supporting groove and being formed in a portion of said stationary mold clamping plate.

2. An injection molding machine as defined in claim 1, wherein the bore of each of said connecting sleeves has an input section for receiving a strut and a rear section having a smaller inner diameter than the input section, the transition point between said input section in said rear section forming said shoulder.

3. An injection molding machine as defined in claim 2, wherein said bolt has a head and each of said connecting sleeves has a rear end defining said rear section of said bore, a surface on said rear end, said head arranged adjacent said surface, and further including at least one washer arranged in contact with said surface, said head abutting said washer.

4. An injection molding machine as defined in claim 1, wherein said stationary mold clamping plate is formed to define an access space associated with each of said sleeve bore defining portions, each said space extending from said bore in a direction away from the mounted injection molding machine and being of a sufficient extent to permit coaxial insertion of said bolt within said sleeve bore.

5. An injection molding machine as defined in claim 1, wherein the injection units also operate into the mold separating groove and wherein the improvement further comprises a carriage, connecting sleeves for supporting an injection unit operating into the separating groove mounted on said carriage, and a slide bearing for clampably mounting said carriage in a slide guide defined on said stationary mold clamping plate.

6. An injection molding machine as defined in claim 5, wherein said injection molding machine has a machine base, a pair of molded struts pivotally connected to said machine base, and wherein said improvement further comprises at least a portion of said connecting sleeves being sleeve-type connecting elements fastened to said molded struts for mounting an injection unit operating into the separating groove.

7. An injection molding machine as defined in claim 1, wherein said machine has a base which defines a planar surface, and wherein an injection unit operating transversely to the separating groove has a sliding base with slide surfaces arranged directly adjacent the planar surface of said machine base.

8. An injection molding machine as defined in claim 7, wherein said slide surfaces are formed by bearing elements constructed from a synthetic material.

9. An injection molding machine as defined in claim 8, wherein the improvement further comprises means having at least one hand lever for moving an injection unit operating transversely to the separating groove into or out of the bores defined in said portions of said stationary mold clamping plate.

10. An injection molding machine as defined in claim 9, wherein said means for moving has a frame fastened to the end of each strut of the respective injection molding machine opposite to the end having said threaded bore, a perforated plate defining a plurality of holes and arranged on the planar surface of said machine base, said frame having a base leg defining a hole and extending perpendicularly to said perforated plate, said base leg arranged with respect to said perforated plate so that said hand lever may be passed through said hole and inserted selectively into one of the holes of said perforated plate for moving the respective injection unit.

* * * * *